(12) United States Patent
Day et al.

(10) Patent No.: US 7,473,168 B2
(45) Date of Patent: Jan. 6, 2009

(54) CONVEYOR FEEDER HOUSE CHAIN SLAT

(75) Inventors: Robert Lee Day, Port Byron, IL (US);
Ryan Patrick Mackin, Milan, IL (US);
Mark Edward Payne, Port Byron, IL
(US)

(73) Assignee: Deere & Company, Moline, IL (US)

( * ) Notice: Subject to any disclaimer, the term of this patent is extended or adjusted under 35 U.S.C. 154(b) by 244 days.

(21) Appl. No.: 11/350,146

(22) Filed: Feb. 8, 2006

(65) Prior Publication Data

US 2007/0072660 A1 Mar. 29, 2007

Related U.S. Application Data

(60) Provisional application No. 60/721,326, filed on Sep. 28, 2005.

(51) Int. Cl.
*A01F 12/00* (2006.01)

(52) U.S. Cl. ............................ 460/16; 56/14.5; 56/14.6

(58) Field of Classification Search ......... 56/14.3–14.6,
56/66, 59, 75, 78, 82, 88, 93, 106, 108, 118,
56/119, 193; 460/16, 70, 114; 198/727,
198/728, 841, 822
See application file for complete search history.

(56) References Cited

U.S. PATENT DOCUMENTS

| | | | | |
|---|---|---|---|---|
| 3,141,281 A | * | 7/1964 | Gaunt et al. ................. 56/14.5 |
| 3,291,327 A | * | 12/1966 | Simmons et al. ............ 414/528 |
| 3,509,699 A | * | 5/1970 | Calder ........................ 56/14.4 |
| 3,669,247 A | * | 6/1972 | Pulver ......................... 198/841 |
| 3,780,851 A | * | 12/1973 | Bichel et al. ................. 198/730 |
| 3,834,408 A | * | 9/1974 | Thalacker .................... 134/83 |
| 3,967,719 A | * | 7/1976 | Kloefkorn et al. ...... 198/550.12 |
| 4,003,191 A | * | 1/1977 | Todd et al. ................... 56/14.6 |
| 4,008,975 A | * | 2/1977 | Cutler ......................... 404/101 |
| D258,500 S | * | 3/1981 | Kloefkorn et al. ............ D34/29 |
| 4,362,005 A | | 12/1982 | Hanaway et al. |
| 4,736,833 A | | 4/1988 | Tanis |
| 5,046,601 A | * | 9/1991 | Burdon et al. ............... 198/731 |
| 5,346,429 A | | 9/1994 | Farley |
| 5,769,712 A | * | 6/1998 | Honas .......................... 460/74 |
| 5,976,013 A | * | 11/1999 | Hamann ...................... 460/114 |
| 6,196,916 B1 | | 3/2001 | Childs |
| 7,090,070 B2 | * | 8/2006 | Linder ......................... 198/841 |

FOREIGN PATENT DOCUMENTS

DE 21 05 960 A1 8/1972

OTHER PUBLICATIONS

European Search Report dated Feb. 8, 2007, (4 pages).

* cited by examiner

*Primary Examiner*—Thomas B Will
*Assistant Examiner*—Mai T Nguyen

(57) ABSTRACT

A new and improved conveyor feeder house chain slat having a unique shape and structure that provides sufficient structural rigidity to improve crop throughput while reducing clogging of crop material. The unique slat also provides additional support to the chain. Because the chain rides on the rear of the elongated section of the slat, the slat contacts the feed house, rather than the chain, reducing chain wear, overheating and lubricant evacuation. Because of the new slat configuration, the slats can be secured to the chain with removable securing means, enabling easier replacement of an individual slat if necessary.

20 Claims, 4 Drawing Sheets

CONVEYOR FEEDER HOUSE CHAIN SLAT

CROSS REFERENCE TO RELATED APPLICATION

This application claims priority to provisional U.S. Patent Application 60/721,326 filed Sep. 28, 2005, titled "Conveyor Feeder House Chain Slat" and having the same inventors as the current application.

FIELD OF THE INVENTION

This invention relates to a crop feeding conveyor for an agricultural harvesting machine, such as a combine or the like, and more particularly to a type of conveyor known as a chain-and-slat type conveyor.

BACKGROUND OF THE INVENTION

Combines are large self-propelled vehicles used for harvesting and threshing agricultural crop in a field. A combine operates by cutting or gathering crop standing in a field, and feeding the cut crop to a separator by means of a conveyor mechanism. In the separator, grain is threshed, or beaten from the husk, stems, pods, or cobs, and then the threshed grain is separated from crop material other than grain. The cleaned grain is moved to a grain tank, and the crop material other than grain is generally distributed back out on the field behind the combine, or collected for use as animal feed or bedding.

The conveyor mechanism typically moves crop material from the header where it is cut from the field, upwardly and rearwardly along a floor of a feeder house to the separator mechanism. Typically, the conveyors have a plurality of continuous chains that are arranged to revolve around a transverse drum at the front of the feeder house and transverse sprocket means at the rear of the feeder house, the chains rotating generally in the direction of the length of the combine. The chains are connected to each other by a plurality of transverse slats, which engage the crop and move it upwardly and rearwardly along the floor of the feeder house. Typically, the slats have an L-shape, and are riveted to the chains at each end of the slat. The transverse slats perform the function of taking the crop material from the header and pulling it up and under the chain towards the separator, along the feeder house bottom floor. If the crop material is not fed to the separator mechanism in a timely and smooth manner, the crop material will back up and can spill out onto the ground, resulting in crop loss, and necessitating operating the combine at a slower speed to prevent additional crop loss. A heavy crop volume can also cause twisting or bending of the slats, which will result in inefficient operation and lead to increased wear, warpage and breakage of slats and/or chains. Additionally, excessive pressure on the slats and chains that occurs when there is a heavy crop load can cause increased friction and heat up the chains, resulting in loss of lubrication, leading to premature chain failure or the need to lubricate the chains more frequently. Therefore, what is needed is a slat that can maintain crop delivery speed to the separator in keeping with harvesting rates while not placing an excessive burden on the feeder chain or slats that would cause excessive or premature wear or failure.

SUMMARY OF THE INVENTION

Accordingly, it is an object of the present invention to provide an improved conveyor slat for a chain-and-slat type conveyor for feeding a crop in a harvesting machine such as a combine. More specifically, the improved conveyor slat comprises two "U-shaped" sections having the base of the U-shapes joined together along substantially the entire length. The shape of the slat provides for increased structure and rigidity over prior art slats, increasing crop-processing efficiency and reducing wear and breakage. One U-shaped section is longer than the other section, the longer piece being of a sufficient length that the feeder chains ride on the base, or back, of that extended U-shape, rather than on the feeder house floor, which reduces friction on the chain, which can lead to heating and consequent loss of lubrication, along with increased failures and wear. Additionally, the slats are bolted to the chain, rather than being riveted to the chain, making it easier to replace an individual slat if it should become worn or damaged. The ends of both U-shaped sections are tapered to reduce crop material wrapping around the edges thereof or the drum, which can also slow or stop processing, necessitating the combine be turned off and the clog cleared. In some arrangements of the present invention, the leading outer edge of the longer U-shaped section is serrated on the top to better pick up and pull in crop material being fed into the feeder. This improved processing of material reduces back-up of crop material from the header back into the feeder housing.

DESCRIPTION OF THE PREFERRED EMBODIMENT

Figure 1:
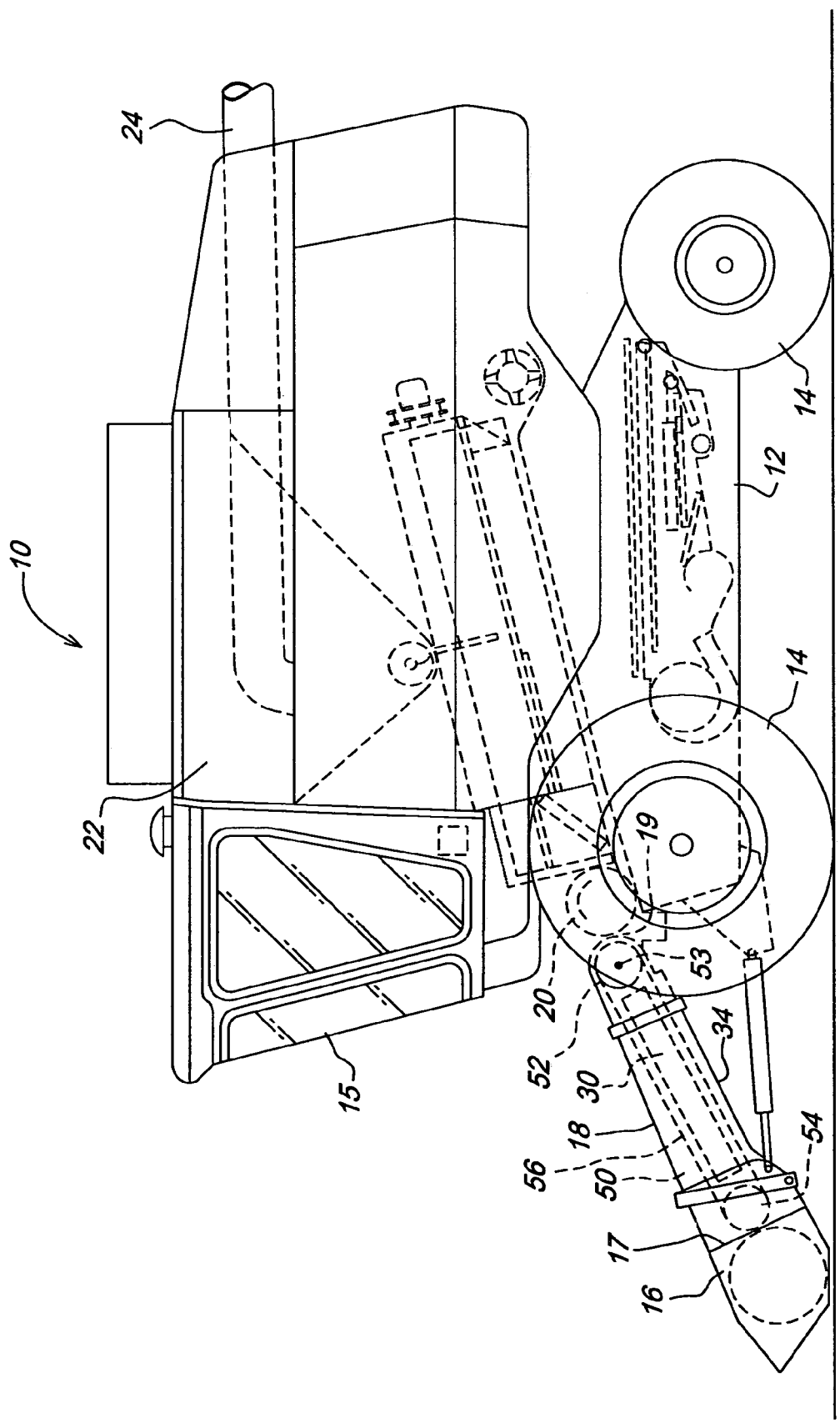
FIG. 1 is a side view of a combine shown with chain-and-slat type feeder house mechanism.

In the discussion of the FIGURES the same reference numerals will be used throughout to refer to the same or similar components. In the interest of conciseness, various other components known to the art, such as crops, storage mechanisms and the like necessary for the operation of the invention, have not been shown or discussed, or are shown in block form.

In the following, numerous specific details are set forth to provide a thorough understanding of the present invention. However, it will be obvious to those skilled in the art that the present invention may be practiced without such specific details. Additionally, for the most part, details concerning harvester combine operation and the like have been omitted inasmuch as such details are not considered necessary to obtain a complete understanding of the present invention, and are considered to be within the knowledge of persons of ordinary skill in the relevant art.

FIG. 1 shows a combine 10 used for harvesting agricultural crops. The combine 10 comprises a supporting structure 12 having ground-engaging wheels 14 extending from the supporting structure 12. The operation of the combine 10 is controlled from the operator's cab 15. A harvesting platform 16 is used for harvesting a crop bearing grain. The cut crop is directed to a crop inlet 17 at a front of a feeder house 18. The crop is directed upwardly and rearwardly through the feeder house 18, then out a rear opening 19 in the feeder house 18 to the separator mechanism 20 which threshes the grain from the crop material. Once the grain has been separated from the crop material, it is fed into a grain tank 22, and is ultimately unloaded from the combine 10 by means of the unloading auger 24 into other transport or storage mechanisms.

Figure 2:
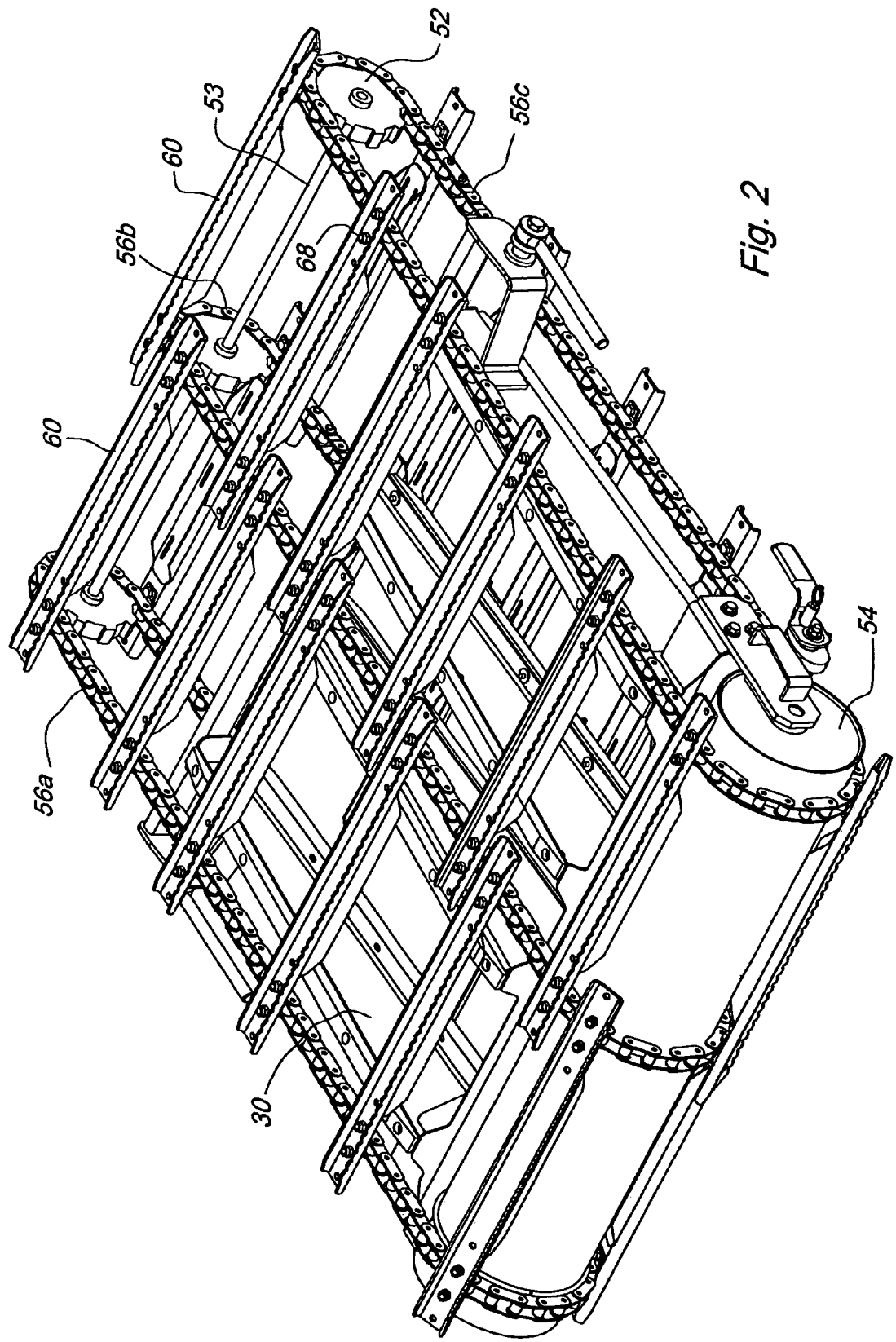
FIG. 2 is a perspective view of a feeder mechanism of a combine utilizing the slats of the present invention.

The feeder house 18 has an internal frame 30 which is used to provide support and structure to the feeder house mechanism 18. The feeder house 18 also has an upwardly and rearwardly inclined bottom floor 34. The chain-and-slat crop feeding conveyor 50 includes rear drive sprocket means 52 adjacent to the rear portion of the feeder house 18, near the separator mechanism 20, and a transverse drum 54 mounted on a shaft adjacent to the forward end of the feeder house 18. The rear drive sprockets 52 are mounted on a shaft 53 which is driven from a power source (not shown) on the combine 10. As shown in FIG. 2, conveyor chains 56 which run parallel to each other and are spaced equidistant from each other are entrained around the rear drive sprockets 52 and the front transverse drum 54. The chains are continuous chains 56 that move laterally in the feeder house 18, around the transverse drum 54 and the sprockets 52. The number of chains 56 used corresponds with the number of drive sprockets 52 affixed to the shaft 53. In the example shown in FIG. 2, three (3) chains 56a, 56b, 56c are used, although it can be appreciated that the number can vary. A plurality of identical slats 60 have their opposite ends connected to adjacent chains 56 and are spaced at regular intervals along the lengths of the chains 56. One end of each slat 60 is connected to the center chain 56b, while the outer ends of alternating slats 60 are attached to one of the outer chains 56a and the outer ends of the remaining slats 60 are attached to the other outer chain 56c, so that the slats 60 are staggered for increased crop processing efficiency.

Figure 3:
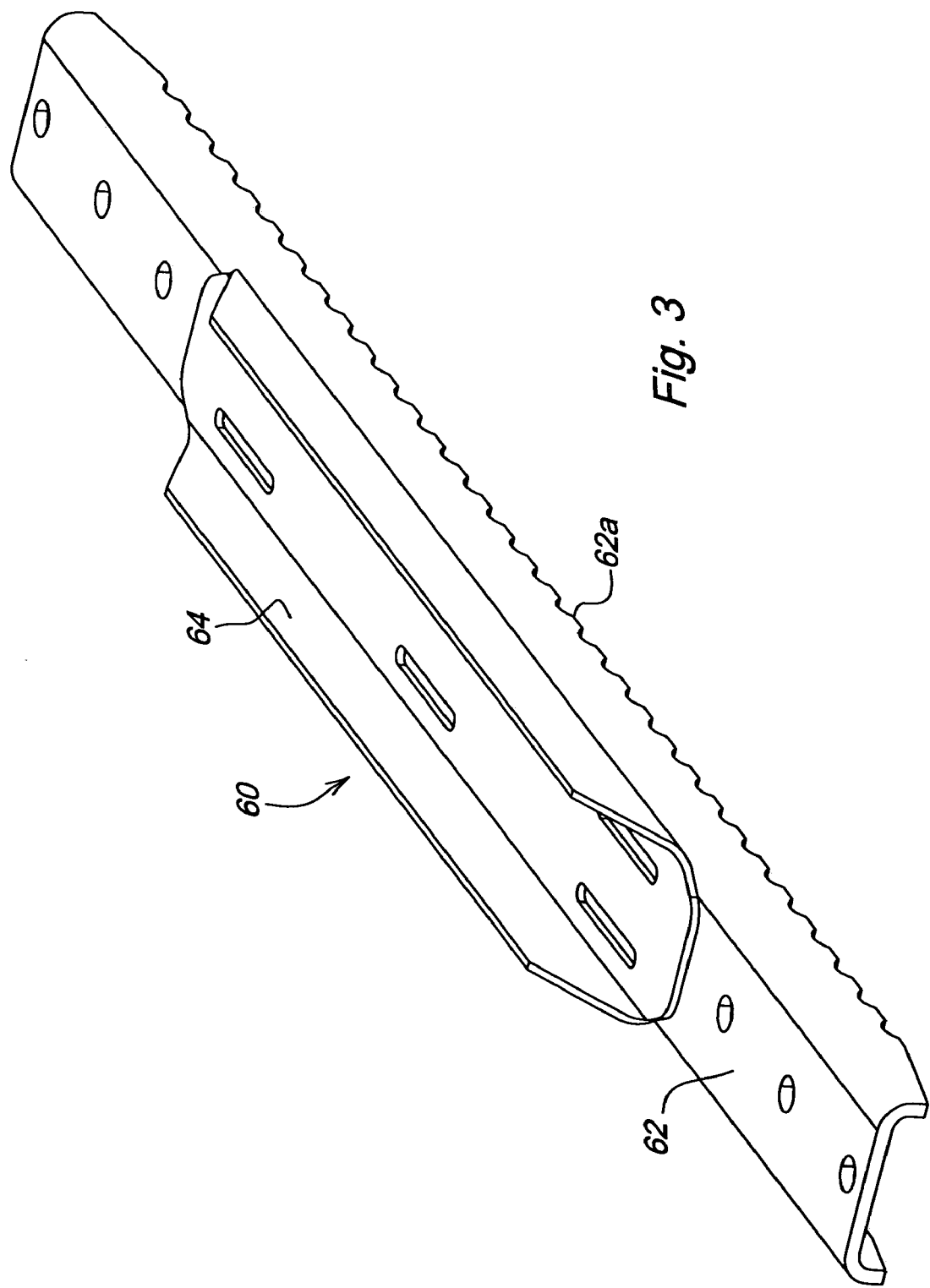
FIG. 3 is a bottom perspective view of a slat mechanism of the present invention.
Figure 4:
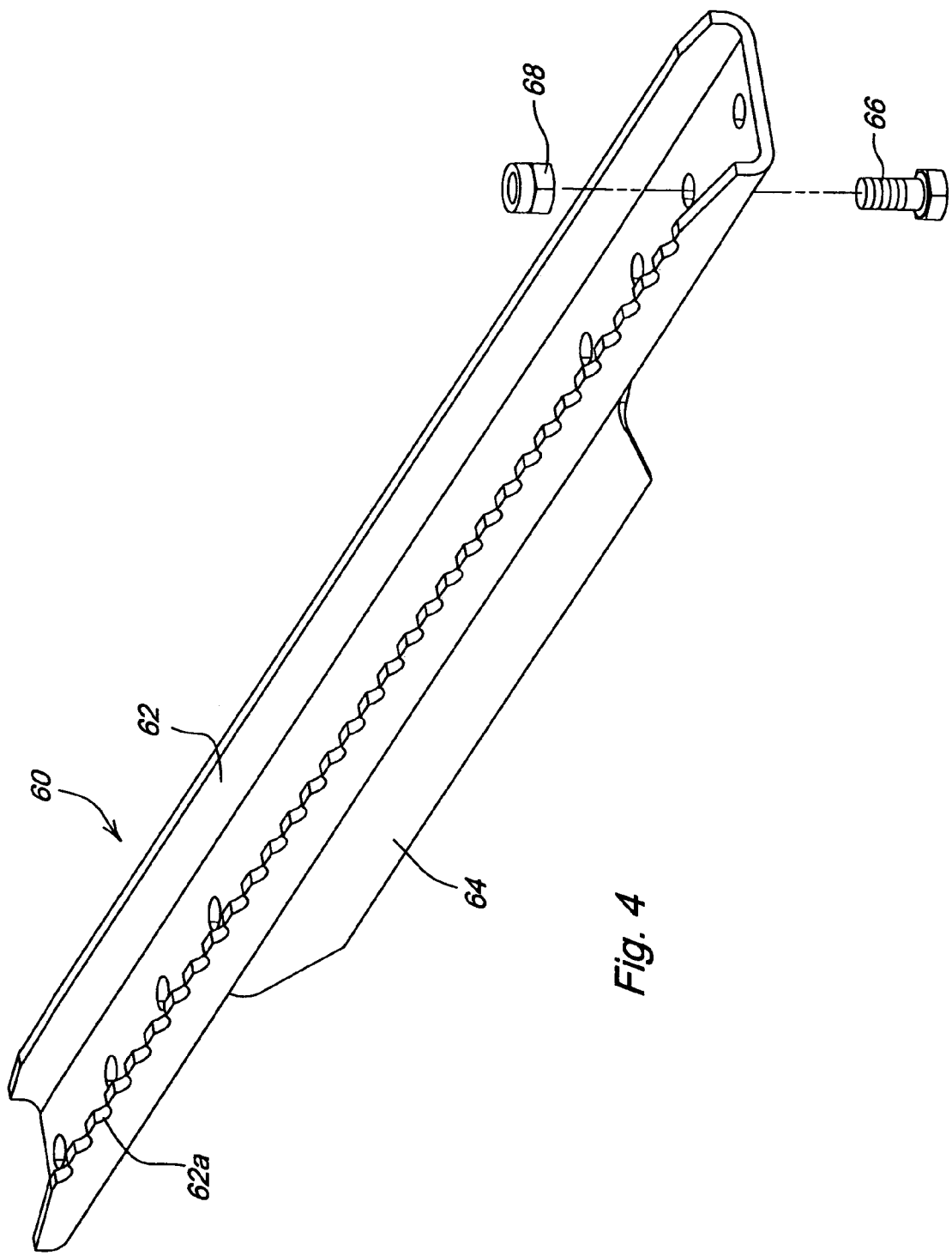
FIG. 4 is a top perspective view of a slat mechanism of the present invention.

As can be seen in FIGS. 3 and 4, each slat 60 is comprised of two U-shaped channel portions: a longer portion 62, and a shorter portion 64, which are joined together at the base, or back of the U-shapes, with the open top sides of each U-shaped portion facing in opposite directions, with the shorter U-shaped portion 64 being centered on the back of the longer 62 U-shaped portion. When viewed from an end, the slat 60 resembles a figure-8 that is open at the top and bottom thereof. The longer U-shaped portion 62 is the one that actually contacts the crop to pull it into the feeder house 18 between the slats 60 on the side of the chain 56 below the transverse drum 54 and sprocket 52 and the feeder house bottom 34, drawing the crop material upwardly and rearwardly into the feeder house 18. In the arrangement of the slat 60 shown in FIGS. 3 and 4, the front or leading edge 62a of the longer U-shaped portion, which first makes contact with the crop material is serrated for greater ability to grip. and pull the crop upwards and rearwards, although it can be appreciated that a non-serrated edge, or a different serration pattern can also be used. The shorter U-shaped portion 64, which is mounted to the center back of the longer U-shaped portion 62 serves the purpose of keeping the chains 56 properly spaced, and maintains additional rigidity and structure to the slat 60 so that the slats to do not bend or flex when drawing crop material into the feeder house 18. A tendency of the slats to bend or twist in the prior art, thus slowing down crop processing and causing difficulties and failures of various components of the feeder house 18 and/or feeding conveyor 50 is overcome by the structure of the slat 60 of the present invention. The shorter U-shaped portion 64 is about the same height as the chains 56 to provide smooth operation so the chains 56 feed properly over the drum 54 and sprockets 52, while still providing the necessary structural rigidity to the slat 60. Additionally, the tapered ends of both the longer and shorter U-shaped portions 62, 64, serve to keep crop material from wrapping around the slats 60 and getting wrapped around the drum 54, which can further clog or slow crop processing, as was seen in the prior art.

Because the outer ends of the short U-shaped portion 64 are tapered, they are less likely to contact the internal frame 30 of the feeder house 18. Additionally, in prior art conveyor mechanisms, the chain 56 would contact the feeder house floor 34 and other components of the feeder house 18, which would increase chain wear and could also cause increased friction on the chain 56, heating the chain and the lubricant, which would cause the lubricant to become more liquid and vacate the chain, requiring additional chain lubrication or more frequent chain failures. The present invention chain slat 60 is longer than previous slats, and the chain 56 is secured to the rear of the longer U-shaped portion 62, and so the outer edges of the open side of the larger U-shaped portion 62 of the present invention contacts the feeder house components, rather than the chain 56 being the contacting portion, thus reducing chain wear and lubrication loss.

The slats 60 are connected to the chains 56 by securing means. In a preferred embodiment, the slats 60 are connected to the chains 56 with bolts 66 and nuts 68, which hold the slats 60 to the chain 56. Because bolts 66 and nuts 68 can be removed more easily than rivets typically used in the prior art, the individual slats 60 can be replaced more easily if a slat 60 is damaged or worn. Because the slat 60 contacts the feeder house 18 rather than the chain 56 contacting the feeder house 18, there is less chance of wear or breakage, and so bolts 66 and nuts 68 can be used to secure the slats 60 of the present invention, unlike in the prior art, where rivets typically had to be used. However, rivets or other securing means ban also be used to secure the slats 60 of the present invention to the chains 56.

In operation, the feeder house 18 has an crop inlet 17 at the front thereof to accept crop from the harvesting platform 16, with crop material being pulled upwardly and rearwardly through the feeder house 18 by being processed between the slats 60 and chains 56 of the underside or lower run of the conveyor 50 and the bottom floor 34. The crop material is delivered to the separator mechanism 20 for processing of the crop through an opening 19 at the rear of the feeder house 18, and the chain 56 and slats 60 continue to rotate in the feeder house 18, now frontwardly and downwardly toward the front of the feeder house 18 to receive more crop material after rotating around the transverse drum 54 and once again moving upwardly and rearwardly toward the separator mechanism 20. The outer edges of the long U-shaped portion of the slats 60 slide along the feeder house bottom floor 34, the serving to pull the material upwardly and rearwardly between the slat 60 and the feeder house floor 34.

Having described the preferred embodiment, it will become apparent that various modifications can be made without departing from the scope of the invention as defined in the accompanying claims.

The invention claimed is:

1. In a combine for harvesting a crop bearing grain, a mechanism for conveying grain from a harvesting platform to a separator mechanism, the conveying mechanism comprising:

feeder house having a forward crop inlet for receiving crop from the harvesting platform, a feeder house bottom, a rear opening for transmitting crop to the separator mechanism; and a conveyor comprising a transverse drum at a front end of the feeder house;

at least two sprocket drive means at a rear end of the feeder house; at least two continuous conveyor chains being entrained around the sprocket drive means and the transverse drum so as to move laterally in the feeder house, around the transverse drum and the sprocket-driven means; and a plurality of slats secured to the continuous conveyor chains, the slats formed from a first long U-shaped piece of sufficient length to span at least the width of adjacent conveyor chains, and a second shorter U-shaped piece of a length to fit between adjacent conveyor chains, the first U-shaped piece and the second U-shaped piece each have a base opposite an open top, the bases of the long and short U-shaped piece being joined together with the short U-shaped piece centered on the long U-shaped piece so the open tops of the long and short U-shaped pieces face in opposite directions, and the slats being secured to the conveyor chains by a securing means secured through the chains and a plurality of through-material holes in the long U-shaped piece such that the crop material is drawn upwardly and rearwardly into the conveyor between the slats on an underside of the chain and the feeder house bottom and moved toward the separator mechanism.

2. The conveying mechanism of claim 1 wherein the securing means comprise nuts and bolts.

3. The conveying mechanism of claim 1 wherein at least a portion of the leading outside edge of the long U-shaped piece is serrated for improved crop material processing.

4. The conveying mechanism of claim 3 wherein at least a portion of the trailing outside edge of the long U-shaped portion is also serrated for improved crop material processing.

5. The conveying mechanism of claim 1 wherein more than two continuous conveyor chains are entrained around the mechanism, and the slats are secured to the chains in a staggered manner in respect to the position in which the slats are secured to adjacent chains for increased crop processing efficiency.

6. The conveying mechanism-of claim 1 wherein the long and short U-shaped pieces each having tapered ends.

7. The conveying mechanism of claim 1 wherein the long U-shaped pieces have tapered ends.

8. The conveying mechanism of claim 1 wherein the short U-shaped pieces have tapered ends.

9. A slat for a chain and slat conveyor for a feeder house in a harvesting machine such as a combine, the slat comprising:
a first U-shaped section having open ends and a base opposite an open top;
a second U-shaped section having open ends and a base opposite an open top, the second U-shaped section being shorter than the first U-shaped section;
the first and second U-shaped sections being joined together at the bases thereof such that the open top sides of the two U-shaped sections of a slat are oppositely directed, the second, shorter U-shaped section being centered in length of the first, longer U-shaped section; and the longer U-shaped section having a plurality of through-material holes at the outer ends of the base for securing the slats to chains using a securing means.

10. The slat of claim 9 wherein the ends of the first and second U-shaped sections are tapered.

11. The slat of claim 9 wherein the ends of the first U-shaped section are tapered.

12. The slat of claim 9 wherein the ends of the second U-shaped section are tapered.

13. The slat of claim 9 wherein at least a portion of a leading outside edge of the open top side of the first U-shaped piece is serrated.

14. The slat of claim 13 wherein at least a portion of a trailing outside edge of the open top side of the first U-shaped portion is also serrated.

15. A method of processing of crop material through a combine feeder house having a transverse mounted drum mounted on a shaft at a front thereof and one or more drive sprockets at a rear thereof with one or more chains positioned around and rotating around the transverse mounted drum and one or more drive sprockets, with one or more chain slats formed of an upper U-shaped channel and a lower U-shaped channel, each channel having a base opposite an open top, joined at their bases being mounted between the chains, the slats positioned parallel to the transverse drum, the method comprising:
providing crop material at an inlet of the feeder house,
gripping the crop material between the open top of the lower U-shaped channel and a bottom floor of the feeder house,
pulling the gripped crop material along the bottom floor and through the feeder house,
during the gripping step or pulling step, engaging the upper U-shaped channel against the drum to prevent the slat from twisting under a crop load created by gripping or pulling crop material.

16. The method of claim 15 wherein the step of gripping includes gripping the crop material with at least a partially serrated leading edge of the open top of the lower U-shaped channel of the slats, the at least partially serrated leading edge for increasing a volume of crop material processed through the combine feeder house.

17. The method of claim 16 wherein the step of gripping includes gripping the crop material with at least a partially serrated trailing edge of the open top of the lower U-shaped channel, the at least partially serrated trailing edge for further increasing the volume of crop material processed through the combine feeder house.

18. The method of claim 15 wherein the step of gripping includes the step of gripping the crop material in a right edge engagement area, a center engagement area, and a left edge engagement area each between the lower U-shaped channel and the bottom floor of the feeder house, wherein the crop material is gripped with more pressure in the center engagement area by the lower U-shaped channel than in either of the right or left edge engagement areas.

19. The method of claim 15, wherein the engaging step includes engaging both legs of an open top end of the upper U-shaped channel against the drum.

20. The method of claim 15, comprising the steps of: during the engaging step, transferring a portion of the crop load through upper U-shaped channel of the slat onto the drum.

* * * * *